B. V. EDWARDS.
MACHINE FOR MOLDING PLASTIC MATERIAL INTO BLOCKS OR BODIES.
APPLICATION FILED JAN. 4, 1915. RENEWED APR. 9, 1918.
1,271,552.
Patented July 9, 1918.
9 SHEETS—SHEET 6.
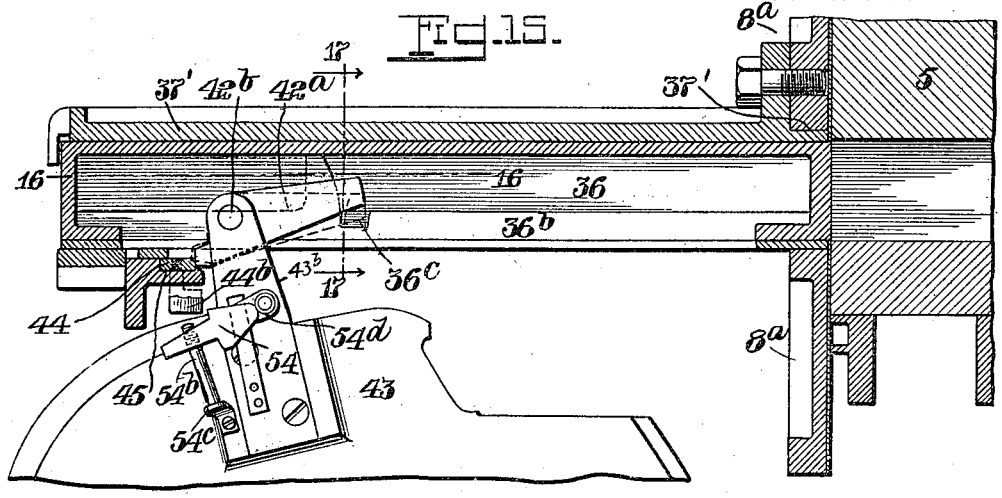
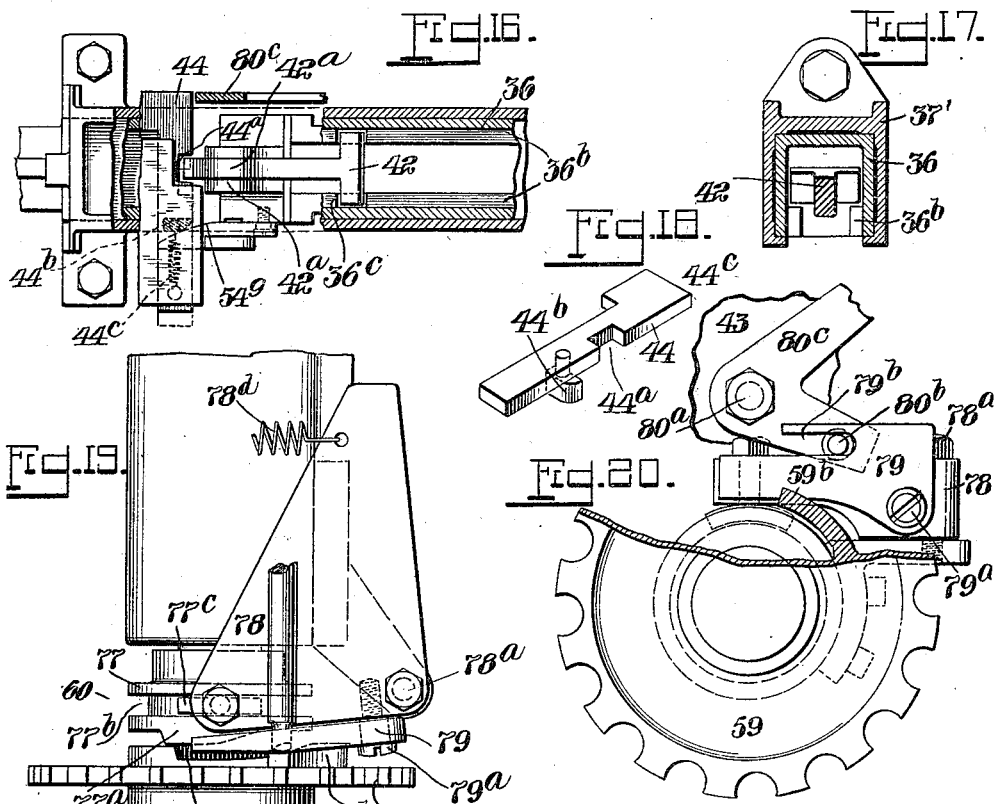

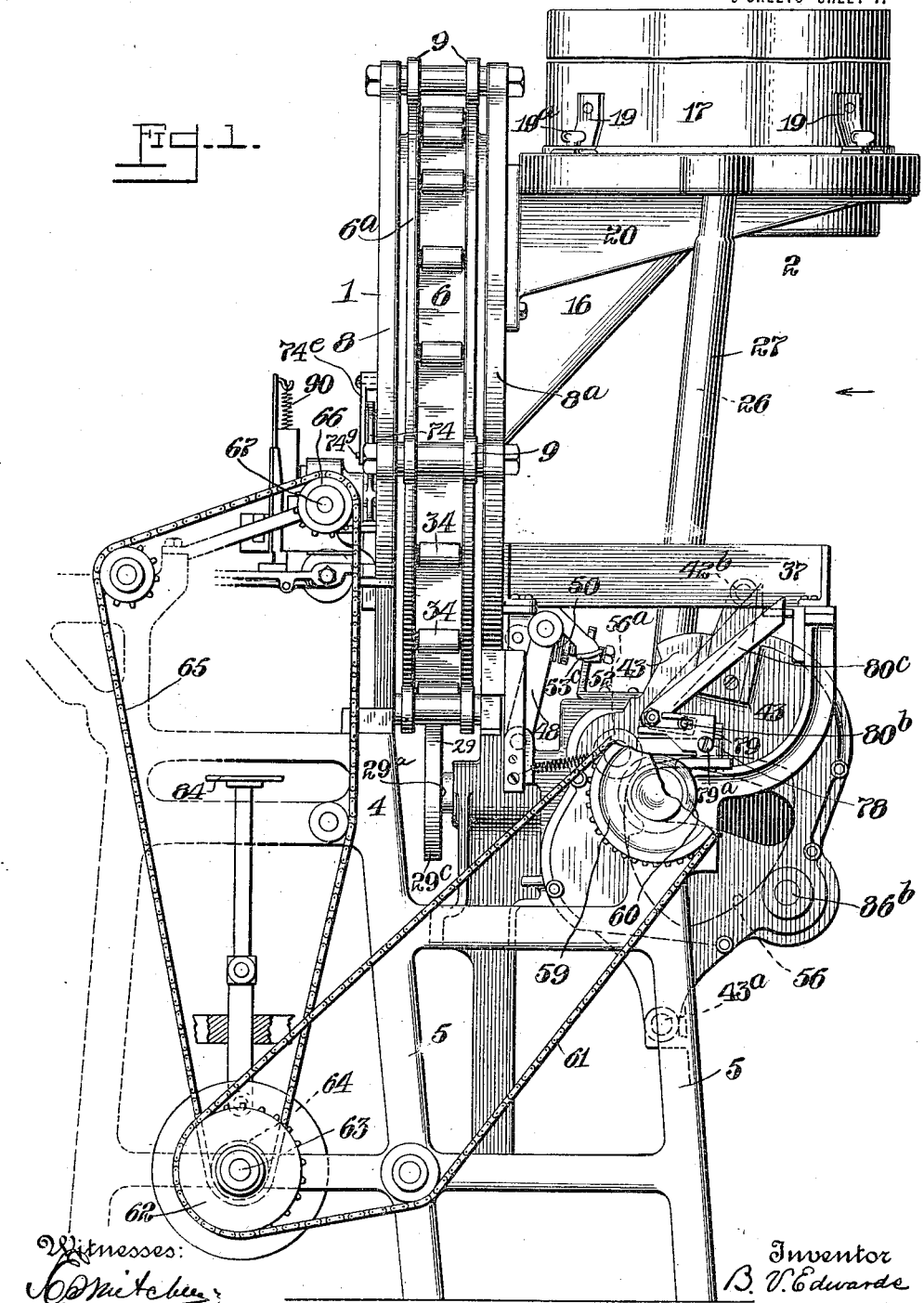

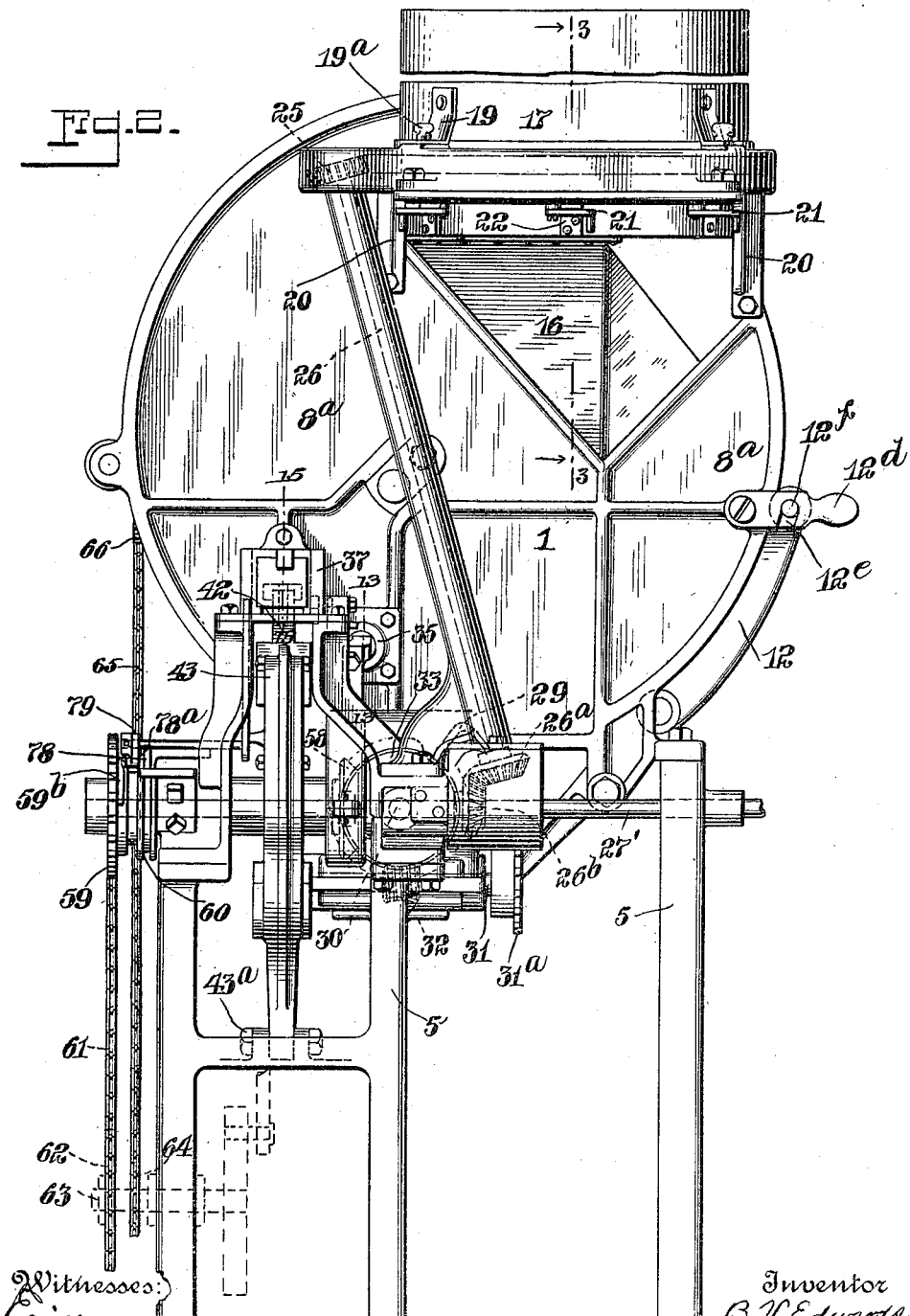

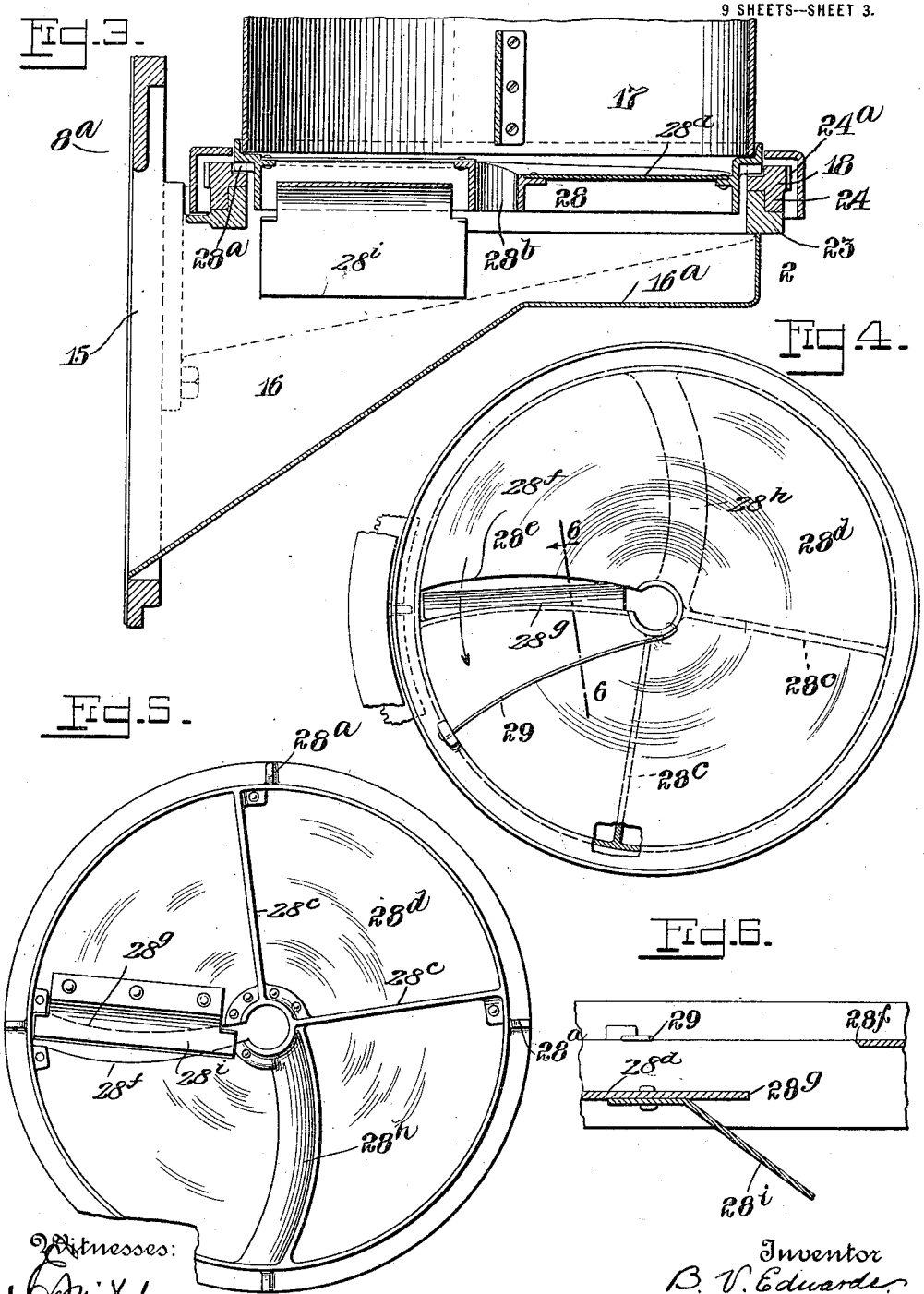

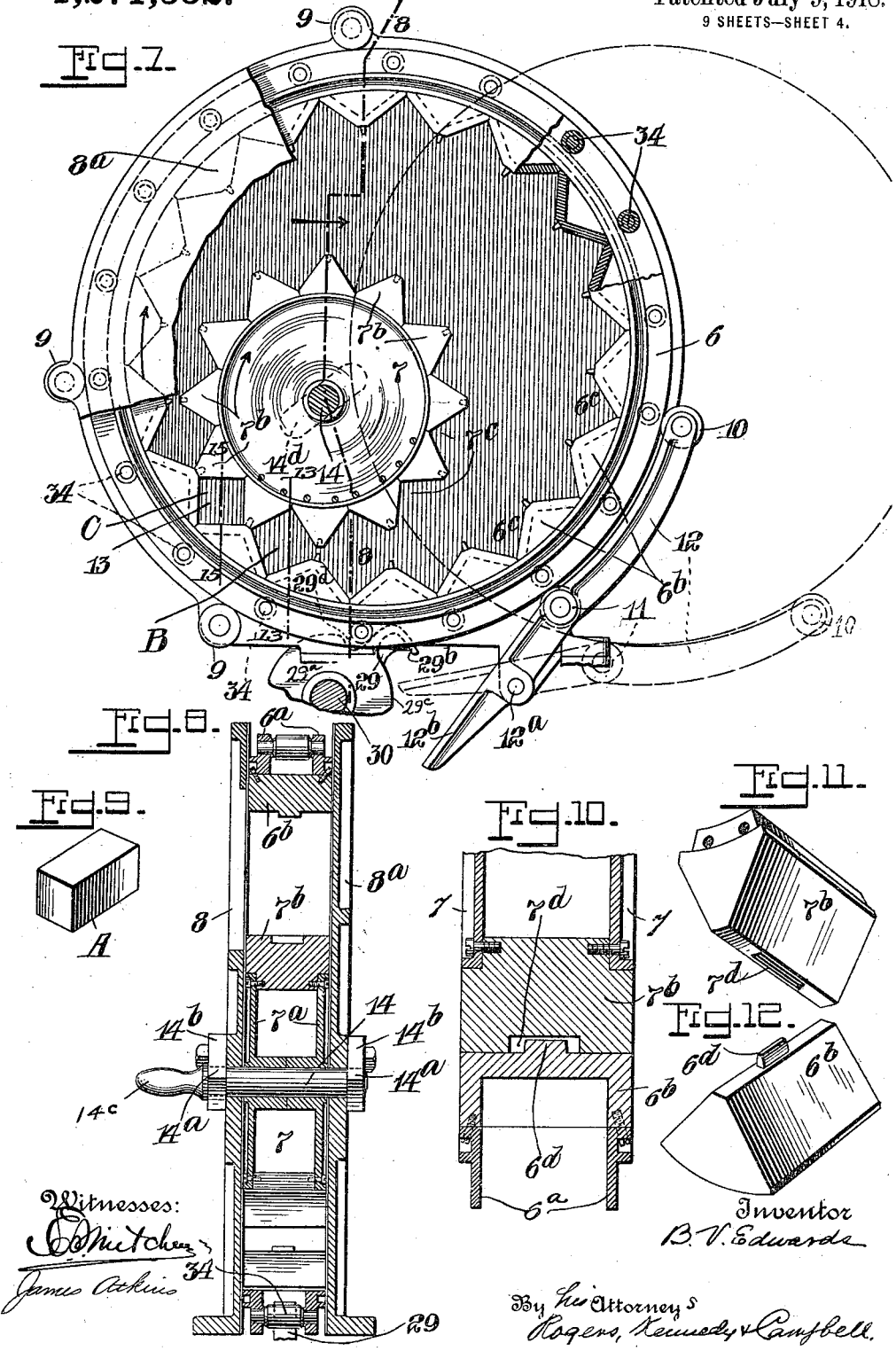

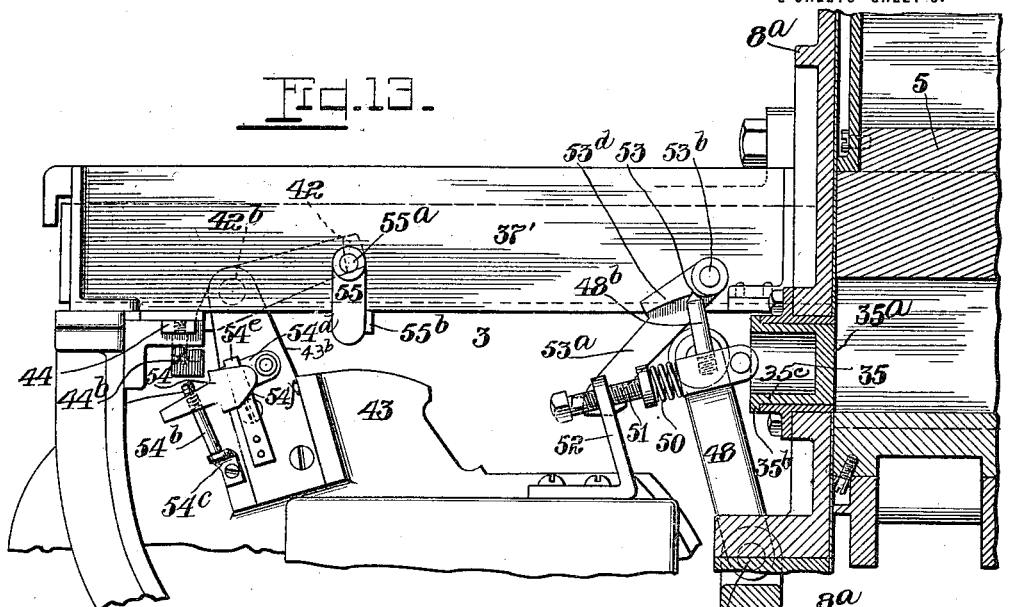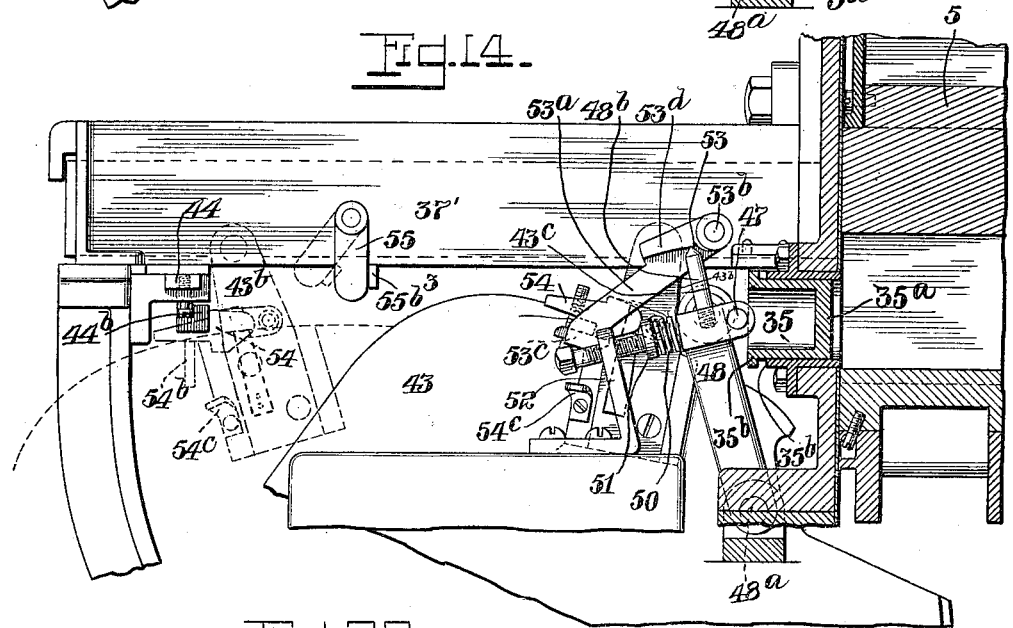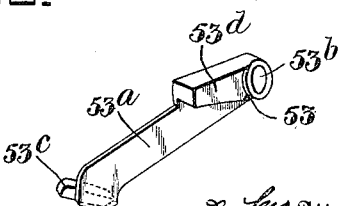

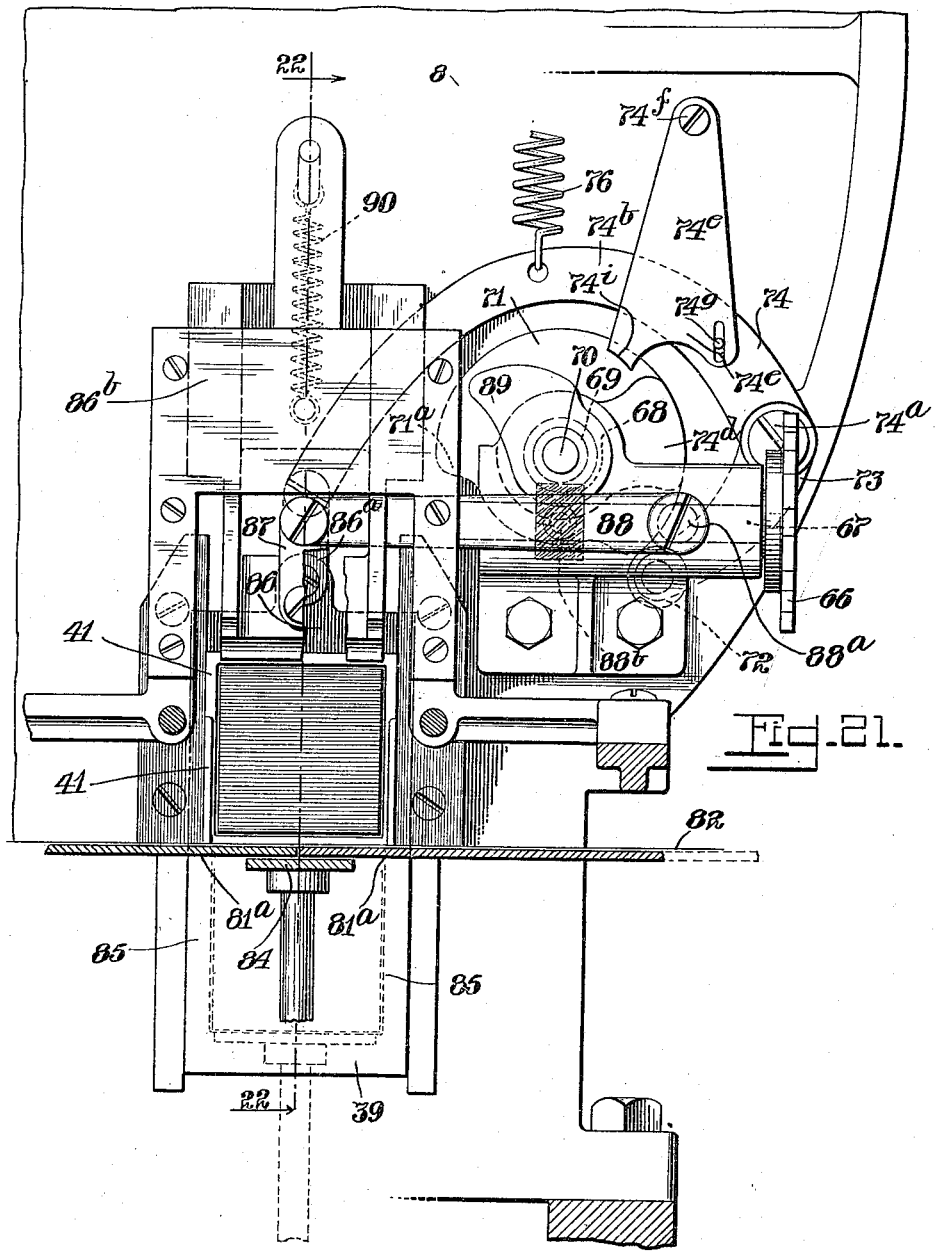

B. V. EDWARDS.
MACHINE FOR MOLDING PLASTIC MATERIAL INTO BLOCKS OR BODIES.
APPLICATION FILED JAN. 4, 1915. RENEWED APR. 9, 1918.

1,271,552.

Patented July 9, 1918.
9 SHEETS—SHEET 8.

Witnesses:

Inventor
B. V. Edwards.

By his Attorneys
Rogers, Kennedy & Campbell

B. V. EDWARDS.
MACHINE FOR MOLDING PLASTIC MATERIAL INTO BLOCKS OR BODIES.
APPLICATION FILED JAN. 4, 1915. RENEWED APR. 9, 1918.
1,271,552.
Patented July 9, 1918.
9 SHEETS—SHEET 9.
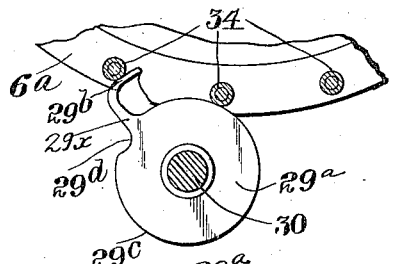
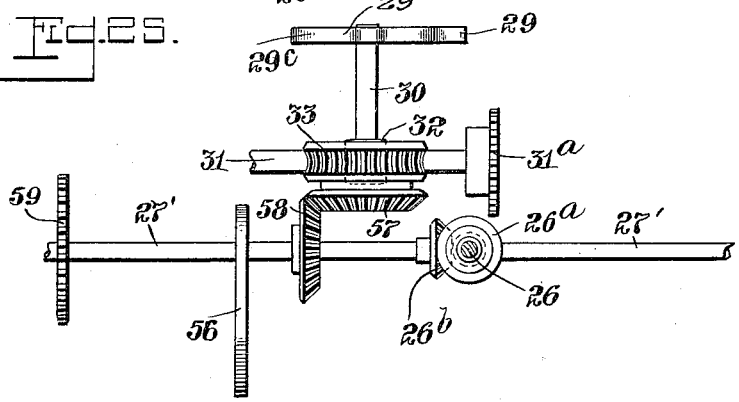
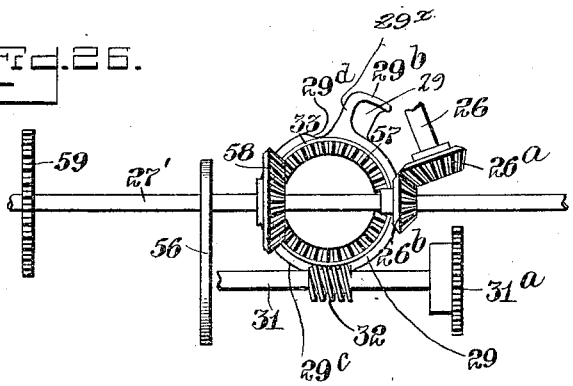

UNITED STATES PATENT OFFICE.

BRUCE V. EDWARDS, OF NEWARK, NEW JERSEY, ASSIGNOR TO EDWARDS ENGINEERING AND MANUFACTURING COMPANY, A CORPORATION OF NEW JERSEY.

MACHINE FOR MOLDING PLASTIC MATERIAL INTO BLOCKS OR BODIES.

1,271,552.  Specification of Letters Patent.  Patented July 9, 1918.

Application filed January 4, 1915, Serial No. 373. Renewed April 9, 1918. Serial No. 227,599.

*To all whom it may concern:*

Be it known that I, BRUCE V. EDWARDS, a citizen of the United States, residing at Newark, in the county of Essex and State of New Jersey, have invented certain new and useful Improvements in Machines for Molding Plastic Material into Blocks or Bodies, of which the following is a specification, reference being had therein to the accompanying drawing.

This invention relates to a mechanism for forming plastic material into blocks or bodies, and has reference more particularly to the molding of butter into prints, the aim of the invention being to provide mechanism, simple in construction and compact in form which will produce prints of uniform size, shape and density.

With these ends in view, my invention consists of the combination and arrangements of parts illustrated in the accompanying drawings and described in detail in the accompanying specification, said parts constituting a complete organized mechanism of novel construction, embodying a molding or print forming mechanism adapted to separate portions of material from a mass of the same and form it successively into prints or blocks; a feeding mechanism adapted to feed the material to the forming mechanism; and an ejecting mechanism adapted to act on the prints formed by the forming mechanism and eject the same therefrom. The ejecting mechanism is controlled in its operation by the density of the print in course of formation, the control of this mechanism being such, that unless the print is of the proper density, and therefore the proper weight, the ejecting mechanism will not operate to eject the same, and the imperfect print will be mingled with the mass of material being fed to the molding mechanism.

I propose to operate my improved print forming mechanism in conjunction with a machine for applying wrappers to the prints, the said wrapping mechanism embodying a movable member to which the print is delivered, and by which it is started on its course to have the wrapper applied, and I so combine the print forming mechanism with the wrapper applying mechanism, that the latter mechanism will be operated to perform its functions only when a print of the proper density is ejected from the print forming mechanism, the result being that, in the event of an imperfectly formed print being produced, not of the proper density and weight, the wrapping mechanism will be prevented from operating.

In the accompanying drawings I have illustrated my invention in the particular form which I prefer to adopt, and which in practice has been found to answer to a satisfactory degree the ends to be attained. It will be understood however that the construction is susceptible of various changes and modifications, such as would suggest themselves to those skilled in the art; and further it will be understood that the invention is not limited to any particular form or construction of the parts, except in so far as such limitations are specified in the claims.

In the accompanying drawings:

Figure 1 is a side elevation of my improved machine showing so much of the wrapper applying mechanism as is necessary to illustrate the coöperation of the print forming machine with said mechanism.

Fig. 2 is an end view of the machine as viewed in the direction of the arrow in Fig. 1.

Fig. 3 is a sectional elevation through the feeding mechanism on the line 3—3 of Fig. 2.

Fig. 4 is a top plan view of the same, looking down into the feed hopper.

Fig. 5 is a bottom plan view of the parts shown in Fig. 4.

Fig. 6 is a vertical sectional elevation on the line 6—6 of Fig. 4.

Fig. 7 is a side view of the print forming mechanism, parts of the same being broken away to expose the internal construction.

Fig. 8 is a vertical sectional elevation through the same on the line 8—8 of the preceding figure.

Fig. 9 is a perspective view of one of the prints produced by the forming mechanism.

Fig. 10 is a sectional view on an enlarged scale of two of the coöperating members of the print forming mechanism.

Figs. 11 and 12 are perspective views of details of the print forming mechanism.

Fig. 13 is a vertical sectional elevation on the line 13—13 of Figs. 2 and 7, showing the mechanism by which the ejection of the formed print is controlled.

Fig. 14 is a similar view showing the parts in a different position.

Fig. 15 is a vertical sectional elevation on the line 15—15 of Figs. 2 and 7, showing the ejecting slide and the means by which it is operated.

Fig. 16 is a horizontal sectional plan view on the line 16—16 of Fig. 15.

Fig. 17 is a transverse vertical section on the line 17—17 of Fig. 15.

Fig. 18 is a perspective view of a detail.

Fig. 19 is a plan view of the clutch, controlling the operation of the wrapper applying mechanism.

Fig. 20 is an end view of the same with parts broken away.

Fig. 21 is an elevation of the parts of the wrapper applying mechanism to which the print is delivered by the ejector.

Fig. 23 is a perspective view of a detail.

Fig. 24 is an elevation partly in section of the mechanism for rotating the forming ring.

Fig. 25 is a diagrammatic plan view of the operating shafting and gears for the machine.

Fig. 26 is an elevation of the same.

Figure 22:
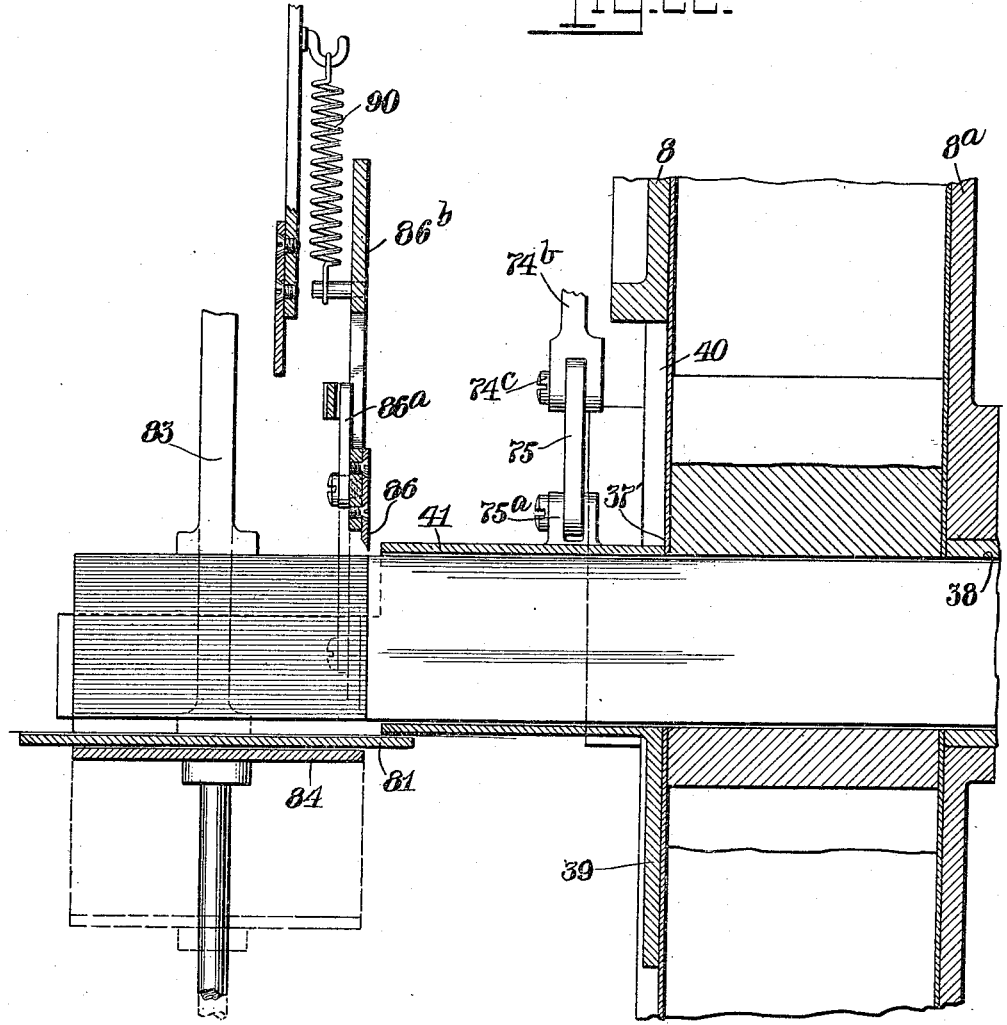
Fig. 22 is a vertical section through the same on the line 22—22 of Fig. 21.

Referring to the drawings:

My improved machine embodies as its main features a print forming or molding mechanism 1 which acts on the mass of material delivered thereto and forms the same into rectangular blocks or prints A of the form shown in Fig. 9; a feeding mechanism 2 by which the material is continuously fed to the forming mechanism; and a print ejecting mechanism 3, by which the finished print is ejected from the forming mechanism. These parts are sustained by a suitable frame structure 4 supported by legs or standards 5.

The print forming mechanism comprises an outer forming member in the form of a ring 6, and an inner forming member in the form of a disk 7, which members are mounted for rotation between vertical fixed circular plates 8 and 8ª, sustained by the machine frame and spaced apart so as to constitute a forming chamber, the adjacent faces of the ring and disk being so constructed, that, in their rotation, they will conjointly form successive mold cells, in which the material fed to the forming chamber will be molded into blocks or prints A. Supporting rolls 9 are mounted at intervals between the plates at their peripheral edges, which rolls are arranged at substantially equal distances apart at one side of the center of the plates. The forming ring is rotatably mounted on these rolls, which give the ring support at one side, and it is maintained in position between the plates, and supported at its other side, by means of two rolls 10 and 11 carried by a frame 12 mounted to swing downwardly, as shown by dotted lines in Fig. 7, for the purpose presently to be described.

The forming ring comprises two annular frames 6ª having fixed to their inner edges inwardly extending blocks 6ᵇ, the faces of which slope outwardly from each other, thereby producing on the interior of the ring, a series of formative cavities or recesses 6ᶜ, the walls of which are disposed at right angles to each other. The forming disk 7 consists of two circular plates 7ª having fixed to their outer edges a series of blocks 7ᵇ, the faces of which slope outwardly in opposite directions, thereby forming in the outer edge of the disk, formative cavities 7ᶜ, the walls of which are disposed at right angles to each other; and in the rotation of the ring and disk, the cavities in the respective parts will conjointly form successive mold cells as at 13. The forming disk is mounted loosely on an axle 14 situated to one side of the axis of rotation of the forming ring, thereby disposing the disk eccentrically within the ring, the result being that at one side the edges of the blocks on the ring and disk will move in contact with each other, while at the opposite side they will be separated by a comparatively wide space 15, which from its widest point, gradually narrows in opposite directions toward the point where the mold cells are formed. The material to be molded is fed into this space by mechanism to be more fully described hereinafter, and the disk and ring being rotated in the direction of the arrows in Fig. 7, portions of the material will be separated from the mass, and will be gradually inclosed by and compressed between the opposing cavities, as the walls of the latter approach each other to form the mold cells, the greatest degree of compression of the material occurring just as the walls complete their closing movement at the point indicated at B (Fig. 7), from which point the molded material is carried forward in the closed mold cell to the point C, and from this point as the rotation of the parts continues, the walls of the cell will gradually open.

The forming disk is rotated on the axle by the rotation of the forming ring, the motion of the ring being transmitted to the disk through the engagement of teeth 6ᵈ on the ends of the forming blocks 6ᵇ, in recesses 7ᵈ in the ends of the forming blocks 7ᵇ, the recesses being greater in length than the teeth, to the end that the escape of the material from the recesses will be permitted as the teeth engage therein.

The axle 14 is removably mounted in openings 14ª in bearing plates 14ᵇ, which plates are removably bolted to the outer sides respectively of the vertical plates 8 and 8ª before alluded to, the arrangement being such that the axle may be withdrawn endwise from the bearing plates and the forming disk, by means of a handle 14ᶜ on the end of the axle, the result being that the bearing disk will be released and free to be removed with the forming ring 6 from between the side plates. The axle extends through radial slots 14ᵈ (see Fig. 7) in the vertical plates, which slots are covered by the bearing plates, and the latter are adapted to be removed, and other bearing plates substituted in their place, in order that when occasion arises, a forming disk of different size may be substituted, in the event that it is desired to produce larger or smaller molded prints. The substituted bearing plates will differ from each other in respect to the distance between the openings therein in which the axle is mounted, and the point therein where the fastening bolts extend through the bearing plates and into the side plates, the radial slots in the latter permitting the axle to occupy the different positions relatively to the plates 8ª, as would be required by the employment of different bearing plates.

The forming ring is removable from between the plates 8 and 8ª as before stated, and when in operative position, it is supported by and travels against the supporting rolls 10 and 11 mounted in the frame 12, as shown in Fig. 7, the removal of the ring being effected by swinging the frame downwardly to the position shown in dotted lines in said figure, which action will move the supporting rolls downwardly and will release the ring. The frame 12 is constructed to serve as a cradle or support, on which the ring, when the frame is swung downwardly, may be rolled outwardly from between the plates 8 and 8ª and temporarily supported. To effect this result, the frame 12 is pivoted on a horizontal transverse axis 12ª near its lower end between depending ears on the plates 8 and 8ª, the supporting roll 10 being journaled in the upper end of the frame, and the supporting roll 11 being journaled adjacent the pivotal axis of the same. The frame is provided on opposite sides of its pivotal axis, with a flat supporting surface 12ᵇ which, when the frame is swung downwardly, will form a track or support on which the ring will be received as it is removed, and on which it may be rolled outwardly and given temporary support on the rolls 10 and 11, from which position it may be finally removed from the machine. The frame 12 is held in its upper position to confine and support the ring in operative position, by means of a latch 12ᵈ which is pivoted to the side of the plate 8ª as shown in Fig. 2 so that it may be swung up and down on its axis, and it is provided with a slot 12ᵉ adapted to engage over a pin 12ᶠ projecting outwardly from the side of the frame 12 at its upper end. When the ring is to be removed, the latch is disengaged from the pin and the frame 12 swung downwardly. The axle 14 supporting the forming disk is withdrawn endwise, and the disk being released, it will be received and supported by the ring, and the latter, together with the disk, may be withdrawn forwardly from between the plates 8 and 8ª as previously described.

The feeding mechanism 2 before alluded to operates to introduce the material between the forming ring and forming disk into the space 15, at which point the inner plate 8ª is provided with an opening, into which the material is directed by a chute 16 (Figs. 1 to 6) which at its lower end surrounds said opening and leads upwardly, in position to receive the material from a fixed hopper 17. Between the bottom of the hopper and the upper end of the chute, is arranged mechanism which operates to separate continuously from the lower portion of the mass of material in the hopper, a slice or paring, and to force the same in uniform quantity and continuously downwardly into the chute, whence it passes through the opening in the plate 8ª and enters between the forming disk and forming ring. The hopper 17 is detachably mounted over a circular opening in a fixed horizontal plate 18, by means of slotted bracket plates 19 fixed to the hopper at intervals and adapted to be engaged with clamping screws 19ª projecting upwardly from the plate 18. The plate 18 is fixed to the top of bracket 20 which is in turn fixed to the vertical plate 8ª, and the upper end of the chute 16 is detachably connected with the under side of the bracket 20, by means of locking latches 21 (see Fig. 2) pivoted to the bracket and adapted to engage beneath lugs 22 on the chute. As a result of this construction, both the hopper and the chute may be removed at will to permit access to the operative parts of the feeding mechanism now to be described.

Mounted in a fixed circular guideway 23 in the bracket 20, is an annular rotatable frame 24 provided on its peripheral edge with gear teeth 24ª which are engaged by a driving pinion 25 on the upper end of an upright shaft 26 mounted in a tubular bearing casing 27 fixed to the machine framing, the lower end of the shaft having fixed to it a bevel gear 26ª meshing with a bevel pinion 26ᵇ fixed to a horizontal shaft 27'. This shaft is mounted in suitable bearings in the frame of the machine, and is driven in a manner more fully described hereinafter. Interlocked with and supported by the gear ring 24, so as to rotate therewith, is a horizontal cutting wheel 28, the upper portion of the rim of which is extended outwardly and upwardly then around the lower edge of the hopper while the lower portion of said rim extends downwardly within the gear ring 24. The interlocking connection of the wheel with the gear ring is in the form of lugs 28$^a$ on the wheel (see Figs. 3 and 5), which are engaged in open slots in the upper side of the gear ring, which arrangement permits the wheel to be removed from the ring by lifting the wheel therefrom. The wheel is provided with a central hub 28$^b$, from which extends arms or spokes 28$^c$, to which is connected a circular plate 28$^d$ extending from the rim to the hub and connected at its edges to said parts. This plate is provided with a radial slot 28$^e$, the opposite walls of which are formed by the adjacent edges 28$^f$ and 28$^g$ of the plate, which edges are parallel with each other and are curved slightly inwardly, so as to present their concavity to the direction of rotary movement of the wheel, as indicated by the arrow in Fig. 4. The edge 28$^f$ stands at a higher level than the edge 28$^g$, the plate extending from one edge to the other gradually at a downward inclination, the result being that in the rotation of the wheel at the base of the hopper, a continuous slice or paring will be severed from the body of material therein as the upper edge 28$^f$ of the plate advances through the material, which paring will be of uniform thickness, corresponding to the vertical distance between the two edges of the plate. The separation of the slice from the overlying body of material, is effected by an initial cut made therein in advance of the edge 28$^f$, the latter acting to enter into the initial cut and serving to effect the complete separation of the slice. This initial cut is effected by means of a cutting wire 29 extending radially between the hub and rim of the wheel on a level with the edge 28$^f$. The wire is provided at its opposite ends with hooks, which are engaged respectively in holes in the rim and hub of the wheel respectively, and the length of the wire is such that it will extend slack between its points of support, and will curve back slightly between its ends. As the wheel is rotated in the direction of the arrow, the wire will be forced into the mass of material, and an initial cut will be made therein. The edge 28$^f$ following in the path of the wire, will enter the cut and will act to separate the slice entirely from the mass.

I deem this slack wire for effecting the initial cut of the material, a very important feature of my invention. On account of the tendency of plastic material to adhere to flat surfaces, it has been found very difficult and impracticable to force a flat blade through the same in effecting the separation of a slice therefrom. By the employment of a wire or cord in the form and arrangement described, this objection is entirely overcome, as the wire does not present any flat or extended surfaces, and it may consequently be caused to enter the same and effect a clean cut without difficulty. By supporting the wire so that it will be slack, it is in better condition to withstand strains without breakage, than if it were held taut.

The separation of the slice is facilitated by means of a radial deflecting rib 28$^h$ fixed to the under side of the plate 28$^d$ some distance back of the edge 28$^f$. This rib following behind the edge 28$^f$ in the rotation of the wheel, will positively deflect the slice downwardly and cause it to leave the plate with certainty through the opening between the edges of the slot therein.

From the construction described it will be seen that as the wheel rotates, a continuous slice of the material will be separated from the bottom of the mass, and will be directed downwardly into the upper end of the chute, which at its outer side extends horizontally beneath the wheel in the form of a flat surface 16$^a$, and from the chute, the material will be advanced through the opening in the vertical plate 8$^a$ of the forming chamber, and into the space between the forming ring and disk.

A scraper plate 28$^i$ is fixed to the under side of the plate 28$^d$ adjacent the edge 28$^g$, and extends downwardly at an inclination therefrom with its lower edge terminating at such point, that it will sweep over the flat surface 16$^a$ of the chute as the wheel rotates, and will thus serve to keep said surface free and cause the material to advance toward the forming mechanism.

The forming disk and ring are rotated or advanced step by step, there being a pause between each forward movement, at which time the ejector mechanism acts to discharge the print, as will be more fully described hereinafter. In order that the parts may be thus moved, and in order that they will be held against displacement during the pause between the movements, I provide the form of driving mechanism for the forming ring shown more particularly in Figs. 1, 2 and 7. This mechanism consists of a rotary arm 29$^x$ fixed to the end of a horizontal rotary shaft 30 mounted in suitable bearings in the frame of the machine, and driven continuously from a main driving shaft 31, mounted in suitable bearings in the frame of the machine, and having fixed to it a worm 32, engaging a worm wheel 33 on the shaft 30, the said shaft being provided with a sprocket wheel 31$^a$ driven from any suitable source of power. The arm extends radially outward from the periphery of a circular hub or disk 29$^a$ on the shaft, and it is extended at its outer end rearwardly as at 29ᵇ, which extended end is curved in the arc of a circle struck from the axis of rotation of the arm as a center. The said disk is provided with a cam surface 29ᶜ having a cavity 29ᵈ located just in advance of the arm. In its successive rotations, the arm is adapted to engage driving lugs on the periphery of the forming ring, in the form of rolls 34, and by such engagement, the ring is advanced step by step, a distance equal to the distance between the centers of the rolls, this movement of the ring being transmitted to the inclosed forming disk through the medium of the driving teeth 6ᵈ and slots 7ᵈ before described. The relation of the driving arm and cam surface to the driving rolls on the forming ring is such, that the cam will intersect the circular path of movement of the rolls, so that during the time that the arm, after disengaging from one roll, is passing around to engage the next, the ring will be prevented from advancing by the engagement of the latter roll with the cam. As the arm engages the roll, the cavity 29ᵈ in the cam will be brought beneath the roll, and as the movement of the arm continues, the roll will be pushed before it, seated in the cavity. As the path of movement of the roll separates from the cam, in the continued rotation of the parts, the arm will maintain contact with the roll, and the ring will be advanced until the rearwardly curved portion of the arm engages the roll, whereupon and by reason of the arcuate curvature of the arm, it will cease to advance the ring farther, and the latter will come to rest. At this moment the next roll, which in the meantime had been moving forward, will contact with the cam, as shown in Fig. 24, so that the ring will be held by this means against forward movement. At the same time the ring will be held also against retrograde movement, by the arm, during the time that the arcuate portion of the same is moving past the forward roll. The driving arm will act therefore in its successive rotations, to advance the forming ring and forming disk step by step, the said parts coming to rest between said advancing movements, and being held against movement in either direction at the first part of the period of pause, and being held against retrograde movement during the remainder of said period of pause.

Referring now to the means for testing the print to determine if it is of the proper density, and to the means for ejecting the print from the forming mechanism, attention is directed particularly to Figs. 1, 2, 3 and 13 to 18 inclusive. The test for density is made at the point in the revolution of the forming ring and disk, where the material to form the print is subjected to the greatest pressure, this being at the point indicated by the letter "B" in Fig. 7, where it will be seen that the opposing cavities in the ring and disk are about to close on the inclosed material. The discharge of the print, if it is found by the test to be of the proper density, is effected at an advanced point in the revolution of the forming members, and after the print formed in the cell at B has been carried forward to the point represented by the letter "C." The mechanism for accomplishing these results, comprises a yielding testing member forming a portion of one of the end walls of the cell at the point B, and an ejecting member which is movable endwise through the cell at the point C, the said testing member being formed to yield only in the event that the print in the cell at B is of the proper density, and the said parts being so co-operatively related, that the ejecting member will be permitted to act to form its ejecting function, only in the event that the testing member yields. As a result, if the print is not compressed to the proper density and is therefore not of the proper weight, it will not be discharged from the forming mechanism, but will be carried beyond the point of discharge and mingled with the mass of material being fed between the forming members by the feeding chute. The yielding testing member is in the form of a cylindrical plunger 35 which is mounted to slide in a circular opening formed in the plate 8ᵃ of the forming mechanism at the point therein where the material is subjected to the greatest pressure, this being at the point indicated by the letter B. The inner face 35ᵃ of the plunger constitutes a portion of one of the end walls of the cell formed at that point, and is therefore subject to the pressure of the material therein. The ejecting member is in the form of a slide 36 (see Fig. 15) which is movable horizontally in a fixed horizontal guiding frame 37' sustained by the plate 8ᵃ and projecting outwardly therefrom. The slide is adapted to move through openings 37 and 38 formed respectively in the plates 8 and 8ᵃ at the point therein where, in the revolution of the forming ring and disk, the cell is presented at C. The slide is provided with a vertical active ejecting face 36ᵃ which exactly fits the cell, and which in the ejecting action slides through the openings 37 and 38 and the intermediate cell, which, for the time being, is in registry with said openings. The vertical face of the slide, when the latter is in normal retracted positon, forms one end wall of the cell, the other end wall being formed by means of a vertical plate 39 (see Fig. 22) which is movable vertically in suitable guides 40 on the outer side of the plate 8ᵃ. The plate 39 when in its upper position, closes over the opening 37 in the plate 8, and when in its lower position it uncovers said opening. The plate 39 carries on its upper end, a horizontal outwardly projecting guiding chamber 41 corresponding in cross-sectional form to the cross-section of the cell, which chamber, when the plate is lowered to uncover the opening, will be moved into registry with the opening, and will receive the print discharged by the ejecting slide. The plate is operated in such manner, as will be more fully described later on, that when the ejecting slide is advanced to eject the print, the plate will be moved down and will uncover the opening 37, thereby bringing the guiding chamber in position to receive the discharged print.

The ejecting slide 36 is of inverted U-shape in cross-section, and is provided on its lower side with inwardly extending longitudinal ledges 36$^b$ provided with opposing notches 36$^c$ therein. These notches are adapted to receive a cross-head 42 on one end of a dog 42$^a$ pivoted between its ends at 42$^b$ on a horizontal axis to the upper end of an operating arm 43. The arm 43 is pivoted at its lower end as at 43$^a$ to the frame of the machine, so that it may be vibrated back and forth in the direction of movement of the ejecting slide. When the head on dog 42$^a$ is engaged in the notches 36$^c$ in the ejecting slide, the latter will be carried back and forth with the operating arm, and the slide will be caused to pass through the cell of the forming mechanism, and will act to discharge the print from said cell. If, however, the cross-head is not permitted to enter the notches, the operating arm will be vibrated idly back and forth without imparting motion to the ejecting slide, the ends of the cross-head, in these idle movements of the arm, being supported and sliding on the ledges 36$^b$. The dog 42$^a$ is held normally with its cross-head above and disengaged from the notches, by means of a horizontal transverse latch 44 mounted to slide endwise to a limited extent in a guideway 45 fixed to the bottom of the guiding frame 37, in rear of the notches 36$^c$. This latch is of the form shown in Fig. 18, being provided in its edge 44 with a notch 44$^a$, and being provided below said notch, and to one side of it, with a depending lug 44$^b$. Normally the latch is in such position in its guideway, that the notch will be out of the path of movement of the outer end 42$^c$ of dog 42$^a$, the latch being held yieldingly in this position by means of a spring 44$^e$ fixed at its ends respectively to the latch and guiding frame 36. The relation of the edge of the latch to the end of the dog is such, that, as the dog is carried by the outward movement of the operating arm toward the latch, with the cross-head 42 resting on and supported by the ledges 36$^b$, the end of the dog will come up against the edge of the latch at the moment that the cross-head arrives at the notches 36$^c$, the result being that the dog will be held in its raised position by the edge of the latch, and the cross-head will be prevented from entering in the notches. By the endwise movement of the latch, however, the notch 44$^a$ therein will be brought into line with the path of movement of the end of the dog, and when the notch occupies this position, the end of the dog will be free to move vertically therein, when the operating arm reaches the limit of its outward movement, and the cross-head on the dog will be free to drop down into the notches in the ejecting slide, thereby forming a driving connection between the operating arm and slide. The latch 44 is controlled in its movements to thus effect driving connection between the operating arm and ejecting slide, by the testing plunger, through the medium of intermediate mechanism now to be described.

Bearing against the end of the testing plunger is a horizontal pin 47 carried by the upper end of a lever 48 pivoted at its lower end to the frame on a horizontal transverse axis as at 48$^a$. The upper end of this lever is acted on by a spiral spring 50, which seats against an adjusting screw 51 screwed into the upper end of a bracket arm 52 extending upwardly from the frame, the tendency of this spring being to urge the testing plunger horizontally inwardly, but permitting it to yield outwardly. The plunger is limited in its inward movement by means of an annular outwardly projecting shoulder 35$^b$ on its outer end, which is adapted to bear against an annular stop surface 35$^c$ at the outer edge of the opening through which the plunger slides, and when the shoulder is engaged with the stop surface, the inner face of the plunger will be flush with the end wall of the mold cell as shown in Fig. 13. Extending upwardly from the upper end of lever 48, is a pin 48$^b$ provided with a pointed end, adapted to seat in a notch 53 in a dog 53$^a$ pivoted at its upper end to the frame on a horizontal transverse axis as at 53$^b$, whence it extends downwardly and outwardly at an inclination and is provided on its lower end with a lateral lip 53$^c$, the notch 53 being situated adjacent to said axis. Adjoining the notch, is a curved ledge or shoulder 53$^d$ which projects laterally from the arm and which extends in the arc of a circle struck from the axis 48$^a$ of lever 48 as a center. Normally, when the testing plunger is at the inward limit of its motion, the pointed end of the pin will be seated in the notch 53, and the dog will be sustained by said pin in its lowermost position, as shown in Fig. 13. When, however, the testing plunger yields outwardly, arm 48 will be rocked outwardly against the force of spring 50, and the end of pin 48 will be forced out of the notch 53 and will pass onto the curved ledge 53$^d$, which action will slightly lift the dog on its axis and cause it to occupy its uppermost position as shown in Fig. 14. The dog when in an elevated position, is adapted to coöperate with the vibratory operating arm 43, when the latter reaches the limit of its inward motion, in such manner as to cause said arm, on its outward movement, to effect connection with the ejecting slide, the result being that the slide will be advanced to perform its ejecting function when the operating arm again moves inwardly. This action of the parts is effected by means of a finger 54 pivoted to the side of the operating arm on a horizontal transverse axis as at 54$^a$, and provided with a vertical depending fixed pin 54$^b$ adapted to seat on a lug 54$^c$ fixed to the operating arm, and by which the downward movement of the finger is limited, and its lowermost position determined. The finger is so mounted on its pivot pin that there will be sufficient friction offered to its movements to hold it yieldingly in the position to which it may be rocked, a friction spring 54$^d$ being provided for this purpose, which is fixed to the operating arm and which bears frictionally against the side of the finger, the finger being so mounted that it can be swung from its lowermost position to its uppermost position as shown in Fig. 14. The finger is provided on its upper edge with a sloping surface 54$^e$, on its lower edge with a sloping surface 54$^f$, and on its inner face with an inclined surface 54$^g$. This latter surface is adapted, when the finger is in raised position, as shown in Fig. 14, to engage the side of the lug 44$^b$ on the latch 44 when the operating arm reaches the limit of its outward movement, by which action the latch will be shifted to a position where the notch 44$^a$ therein will be in line with the path of movement of the end of dog 42$^a$, so that the cross-head on the dog will be permitted to engage in the notches in the ejecting slide and effect driving connection between the arm and slide. The lower sloping surface 54$^f$ on finger 54 is adapted, when the operating arm reaches the limit of its inward movement, to engage with the lateral lip 53$^c$ on the lower end of dog 53$^a$ when said dog is in its elevated position, as shown in Fig. 14, with the result that the finger will be rocked on its axis to its raised position, in which position it will coöperate with the latch 44 as just described, when, by the movement of the operating arm 43, it reaches the limit of its outward movement. Inclined surface 54$^e$ on the upper edge of finger 54 is adapted, when the finger is in raised position and after it has operated latch 44 and is on its return movement inwardly, to engage a pawl 55, pivoted at its upper end as at 55$^a$ to the side of the guide frame 37, and extending at its lower end in the path of said inclined surface 54$^e$, the result being that the finger will be rocked downwardly on its axis by engaging said pawl, and will be restored to its former lower position. The pawl 55 is held against yielding movement inwardly by a stop lug 55$^b$ fixed to the guiding frame and will, when held, serve to rock the finger downwardly as described, but being permitted to yield in the opposite direction, the finger when in raised position, may pass by the pawl without its position being disturbed, when the finger is carried by the operating arm outwardly toward the latch.

It will be remembered that the position of dog 53$^a$ is controlled by the movement of the testing plunger, the outward movement of the plunger acting to raise the dog, and its inward movement permitting the dog to descend to its lowermost inactive position. It will be understood therefore that in the operation of the mechanism described, if the dog is in its lowermost position, finger 54, when it is carried inwardly by the operating arm, will not engage the dog, and the finger will remain in its lowermost position. Consequently on the outward movement of the operating arm toward the latch, the finger will not engage the lug 44$^b$ thereon, and therefore the latch will remain in position to prevent dog 42$^a$ from effecting connection between the operating arm and ejector slide. As a result, the operating arm will vibrate back and forth idly without having any effect on the ejector slide. If, however, the testing plunger is moved outwardly to the position shown in Fig. 14, it will act to raise dog 53$^a$, thereby moving the lip on its lower end in the path of the lower surface 54$^f$ on finger 54. As the finger is now carried by the operating arm inwardly, and reaches the limit of its inward movement, the finger engaging said lip, will be rocked to its uppermost position, where it will be held by the friction spring before alluded to. In this raised position, the finger will be carried outwardly by the return movement of the operating arm, and the surface 54$^g$ on the side of the finger, engaging lug 44$^b$ on latch 44, will shift the latter endwise and carry the notch 44$^a$ therein in the path of movement of the end 42$^c$ of dog 42$^a$, the result being that the cross-head on the dog will be permitted to drop into the notches in the ejector slide, thereby effecting a driving connection between the operating arm and slide. When now the operating arm again moves inwardly, it will carry the connected ejector slide with it, and the latter will be thrust through the cell between the forming disk and forming ring at the point C, and the print will be ejected from said cell. As the operating arm moved inwardly with the connected ejector slide, the upper surface 54$^e$ on finger 54 was carried into engagement with pawl 55 and the finger was restored to its lowermost position. On the outward movement of the operating arm, after the ejector slide has been thrust through the cell to perform its ejecting function, the slide will be withdrawn and carried back to its former retracted position, the latch 44 in the meantime having been shifted endwise by its returning spring, and restored to its former position, with the notch $44^a$ therein out of the path of movement of the end of dog $42^a$. When now the operating arm reaches the limit of its outward movement, the end $42^c$ of the dog will engage the edge of the latch, and the dog will be positively rocked upwardly and its cross-head raised out of the notches in the ejector slide whereby the ejecting slide will be disconnected from the operating arm. When the operating arm moves inwardly again, the cross head on dog $42^a$ will move idly on the ledges of the ejecting slide, and if the testing plunger has been moved outwardly, finger 54 will be set as before, in position to operate latch 44 and cause connection to be made with the ejector slide. But if the testing plunger has not been moved outwardly, then the finger will not be set, so that no connection will be made with the ejecting slide, and the latter will remain in its retracted position. It will be seen therefore that if the butter in the testing cell is of the proper density, resulting in the outward movement of the testing plunger, the ejecting slide will be operated to eject the print, after it has been advanced by the forming members, to the position where it can be acted on by the ejector slide. But if the print is not condensed to the proper degree, the testing plunger will remain in its inner position, and the ejecting slide will not be operated, the result being that the imperfect print will be carried forward, in the rotation of the forming members, and will be mingled with the material being fed to the said members. The degree of density to which the print is compressed in the forming cell at the point B, is controlled by the spring 74, the tension of which may be adjusted by the screw 75. By this means the testing plunger may be set so as not to yield until a predetermined degree of compression in the forming cell has been reached, the result being that the print will not be discharged by the ejector slide if it has not been compressed to such desired predetermined density. After the testing plunger 35 has been moved outwardly as described, by the pressure to which the butter is subjected in the mold cell, it is necessary that the plunger be returned to its former position flush with the end of the cell, otherwise the pressure of the butter in the succeeding cell as the latter is presented at the point where the plunger is located, would prevent the return of the plunger, and consequently the proper operation of the mechanism would be interfered with. I provide for the return of the plunger by the inward movement of the operating arm 43, through the medium of a projection $43^b$ extending upwardly from said arm in position to engage a roller $43^c$ on the upper end of the lever 48, the result of such engagement being to thrust the plunger $35^a$ inwardly as the operating arm completes its inward movement. This action does not interfere with the operation of finger 54 by the dog $53^a$ as heretofore described, because the parts are of such form and so relatively arranged that the action of projection $43^b$ on the roller $43^c$ will take place subsequent to the setting of the finger 54 by dog $53^a$.

The ledge $53^d$ on dog $53^a$ being on a curve with the same radius as that of the path of movement of the end of pin $48^b$ as described, the degree of upward movement of the dog by the pin, when the testing plunger moves outwardly, will be the same without regard to the extent of movement of the plunger, consequently the dog will be raised to the same definite predetermined position whether the plunger yields to a slight extent, or whether it moves to a greater extent. As a result, the location of the lip on the dog in the path of movement of the lower inclined surface on the finger 54, will be assured.

The operating arm 43 is moved inwardly and outwardly by means of a three-sided cam 56 fixed to the shaft 27, before alluded to, which cam is engaged by oppositely arranged rollers $43^a$ and $43^b$ journaled on the side of the operating arm 43, the form, arrangement and relation of the parts being such that the operating arm will pause at the limit of its outward movement. The back and forth movements of the operating arm are so timed, in relation to the step by step advancing movement of the forming ring and disk, that the operating arm will advance and return at each period of rest or pause between the successive advancing movements of the forming members, the advancing movements of the latter occurring during the pause of the operating arm at the limit of its outward movement. By reason of this action of the parts, the print is tested as to its density at one point in the revolution of the forming members, and is ejected, if of the proper density, at another point in the revolution of said members in advance of that where the test takes place. The operating arm moves back and forth continuously and uninterruptedly, but the ejecting slide is moved to perform its ejecting action only when the print in the cell at the point B in the revolution of the forming members, has been condensed to the proper degree and moves the testing plunger outwardly. At other times, and if the print does not possess the proper density, the ejecting slide is left at rest, and the operating arm will move idly back and forth.

The effect of the mechanism described, is, if the print is compressed to the proper degree of density, to automatically set certain parts, on the inward movement of the operating arm, which parts will, when the operating arm moves outwardly, cause the arm to be automatically connected with the ejecting slide, so that when the arm makes its next movement inwardly, the ejecting slide will be carried with it and will act to eject the formed print, which in the meantime has been moved to an advanced position from the point B in the revolution of the forming members, to the point C. If the print is not of the proper density, these parts will not be set, and they will therefore fail to effect a connection between the operating arm and ejecting slide, with the result that the slide will not be operated, and the print which in the meantime has been moved to the advanced position, will not be discharged, but will, as the forming members continue their step by step advance, cause the print to be mingled with the mass of material entering the forming chamber from the feeding chute.

It will be remembered that the print discharged from the forming mechanism by the ejecting slide is received in the guiding chamber 41 carried by vertical plate 39 (Fig. 22) which chamber at the time of action of the slide is moved downwardly and brought in registration with the opening in plate 8, such movement of the chamber causing the vertical plate 39 to also move down and uncover said opening. These parts are moved in the manner mentioned, only when the operating arm 43 actuates the ejector slide, manifestly it being necessary, if the print in the cell opposite the ejector slide is not of the proper density, and therefore not to be discharged, that the plate 39 remain in its upper position closed over the end of said cell. Therefore I have provided mechanism for controlling the movements of plate 39, which mechanism is of such form that the plate will be moved downwardly to permit the discharge of the print, only in the event that the ejector slide becomes active to perform its ejecting function. I prefer to effect this control of the plate in the following manner: The plate receives its motion from the main driving shaft 31 through the medium of shaft 27, before alluded to, which receives its motion from the driving shaft by means of a bevel gear 57 fixed to the worm wheel 33, before alluded to, and meshing with a bevel gear 58 on shaft 27. A sprocket wheel 59 is connected to the end of shaft 27 by means of a clutch mechanism 60, shown more particularly in Figs. 1, 2, 19 and 20, and a sprocket chain 61 passes over sprocket wheel 60 and over a sprocket wheel 62 mounted on a shaft 63 journaled in suitable bearings in the base of the main frame. Shaft 63 carries a second sprocket wheel 64 from which a chain 65 passes upwardly and drives a sprocket wheel 66 mounted on a horizontal shaft 67 journaled in bearings on the main frame adjacent the outer side of plate 8. Shaft 67 has fixed to it a worm 68 engaging a worm wheel 69 fixed on a horizontal shaft 70 mounted in suitable bearings on the main frame, and extending above and at right angles to shaft 67. A cam 71 is fixed to shaft 70 and is engaged by a roller 72 on the lower arm 73 of a two-arm lever 74 which is pivoted as at $74^a$ to the machine frame on a horizontal axis. The upper arm $74^b$ of this lever is pivoted as at $74^c$ to the upper end of a link 75, the lower end of which is pivoted as at $75^a$ to the upper side of the guiding chamber 41. A spring 76 is connected respectively with the arm $74^b$ and the machine frame, and pulls up on the arm, thereby holding the roller 72 in yielding engagement with cam 71. The cam is so shaped that in its rotation, it will positively lower plate 39 from in front of the opening through which the ejector plunger acts, and will hold the plate in its lower position a sufficient length of time to permit the ejecting slide to advance through the cell in discharging the print therefrom, and return to its former position, the plate after the retreat of the slide, being positively raised to its former position by means of a cam $74^d$ carried by shaft 70 and adapted to engage a lever $74^e$ pivoted at its upper end on a horizontal transverse axis $74^f$ to the side of plate 8. The lever extends at its lower end adjacent the side of arm $74^b$ to which it is connected by means of a pin $74^g$ on the side of the arm, engaging loosely in a vertical slot in the lever. The form of the cam and its timing in relation to the lever and cam 71 is such that when the arm $74^b$ is in its lower position, with the plate 39 in its depressed position, the end of cam $74^d$ will be free of a segmental surface $74^i$ on the lever $74^e$, and as the cams rotate in the direction of the arrow in Fig. 21, cam $74^d$ will engage the end of said segmental surface and will act to swing the lever $74^e$ to the right, which action will positively raise arm $74^b$ to its upper position. While this action is taking place, a drop surface $71^a$ in cam 71 is presented to the roller 72, whereby the upward movement of the arm in the manner described is permitted. It will be noted that the segmental surface $74^i$ on lever $74^e$ corresponds in curvature to the radius of the cam, and when the cam has acted to raise the arm 74ᵇ as described, the surface of the cam will be in engagement with said segmental surface on the lever, whereby the arm will, for the time being, be locked in raised position.

The clutch mechanism 60 (see Figs. 19 and 20) before alluded to as connecting sprocket wheel 59 with shaft 27, is adapted to be controlled in its action by the latch 44, which in turn, as has been before described, coöperates with certain parts in controlling the operation of the ejector slide by the operating arm 43. The clutch is controlled by the latch in such manner that the sprocket wheel 59 will not be connected with its shaft and driven thereby, unless the latch has been shifted to cause the operating arm to make connection with the ejector slide, the result being that plate 39 and guiding chamber 41 will not be lowered, unless the ejecting slide is to be operated to discharge the print. The means by which the mechanism is in this manner controlled, consists of the following parts: On reference to Figs. 19 and 20, it will be seen that the sprocket wheel 59 is mounted loosely on the end of shaft 27 and is provided on its inner face with a recess 59ᵃ. Splined to the shaft alongside the sprocket wheel, is a collar 77 capable of sufficient motion longitudinally of the shaft to engage a tooth 77ᵃ on the collar in the recess in the wheel, and thus effect driving connection between the collar and the wheel, or to disengage the same therefrom so as to disconnect the wheel. The collar is rotated constantly with shaft 27, and is provided with a peripheral groove 77ᵇ in which loosely engages a shoe 77ᶜ depending from the under side of a horizontally movable plate 78 mounted at one corner on a vertical pivot 78ᵃ sustained by the frame of the machine. The plate is acted on by a spring 78ᵈ fixed to the frame and plate respectively, and tending to shift the plate in a direction to cause the engagement of tooth 77ᵃ in recess 59ᵃ of the wheel. A vertical dog 79 is pivoted at one end to the end of plate 78 on a horizontal axis 79ᵃ so that the dog may rock upwardly and downwardly. When in its lower position as shown in Fig. 19, the dog extends along the inner side of a sloping cam surface 59ᵇ on the inner face of the sprocket wheel 59, the dog when in this position, maintaining the tooth 77ᵃ on the driving collar out of engagement with the recess in the wheel, whereby driving connection between the collar and wheel will be interrupted. When the dog 79 is raised however to its upper position, it will disengage from the cam surface 59ᵇ, and spring 78ᵈ will shift plate 78 on its axis and thereby shift collar 77 endwise and cause the tooth thereon to enter the recess in the sprocket wheel, and thus effect driving connection between the shaft 27 and the sprocket wheel. The movement of dog 79 to thus control the driving connection between the shaft and sprocket wheel is controlled by the latch 44 through the medium of an elbow lever 80 which lever is pivoted on a horizontal transverse axis to the operating arm as at 80ᵃ. The lower arm of the lever is provided with a horizontal pin 80ᵇ which is adapted, when the operating arm reaches the limit of its outward movement, to engage loosely in an open horizontal slot 79ᵇ in dog 79. Normally, with the clutch disengaged and the latch 44 in its forward position, with the dog 42ᵃ held out of engagement with the ejector slide, upper arm 80ᶜ of the lever 80 will stand in advance of the forward edge of the latch but out of the path of the same. When now the latch is shifted endwise to the position shown in Fig. 16, to effect connection between the operating arm 43 and the ejector slide, the end of the latch will be projected in the path of arm 80ᶜ and as the operating arm 43 reaches the limit of its outward movement, the arm 80ᶜ will be brought into engagement with the edge of latch 44 and the lever 80 will be rocked on its axis, which action will raise pin 80ᵇ and lift dog 79, thereby disengaging the same from the cam surface on the sprocket wheel, whereupon spring 78ᵈ will rock plate 78 on its axis and move the driving sleeve 77 endwise and engage its tooth 77ᵃ in the notch in the sprocket wheel. Plate 39 and chamber 41 will now be lowered by the driving connection between sprocket wheel 59 and cam 71. The sprocket wheel will make a complete revolution and will then automatically come to rest, which action is effected by means of the sloping cam 59ᵇ on said wheel, moving into engagement with the side of dog 79 and acting by such engagement to rock plate 78 and disengage the tooth on the driving collar from the notch in the sprocket wheel, the said arm 80ᶜ in the meantime being disengaged from the end of the latch by the inward movement of the operating arm 43, thereby permitting dog 79 to be lowered to its former position in the path of the sloping cam on the sprocket wheel, and the latch being returned to its former position, by spring 44ᵉ. During the period of the connection of the clutch, that is while the sprocket wheel 59 is making a complete revolution, cam 71 will also make a complete revolution, and by this action the plate 39 and chamber 41, on being lowered, will be returned to their upper position and the plate will again close over the opening 37. It is seen therefore that the plate and chamber are moved downwardly to permit the discharge of the print by the ejector slide, only when connection is made between the operating arm 43 and the ejector slide, the plate and chamber remaining at all other times in their upper position, with the plate closed over the opening 37.

The print discharged by the ejector slide is pushed by the latter through the guiding chamber 41 and over a receiving platform 81 forming a part of a wrapping mechanism for applying wrappers to the prints, which platform is in the form of two separable horizontal sections 81ª and on which is placed a sheet of paper 82 to form the wrapper. When the print arrives over the platform, it moves downwardly seated on the wrapper and supported by a table 84, sections 81 of the platform in the meantime having been withdrawn to permit this action. As the downward movement continues, the print is carried between vertical walls 85 which serve to fold the wrapper inwardly and upwardly at the sides of the print. From this point on, the wrapper is subjected to other folding actions to complete the wrapping operation, by mechanism not shown as it forms no part of the present invention. As the print descends in the manner described, it is separated at its end from the end of the ejecting slide, by means of a vertically moving stripping knife 86 so actuated that its descent along the face of the slide will be simultaneous with the descent of the print. This knife is carried by a slide 86ª movable vertically in suitable guides 86ᵇ fixed to the machine frame, and the slide is connected by means of a link 87 to the free end of a horizontal operating lever 88 pivoted at its opposite end to the frame of the machine on a horizontal axis as at 88ª. The lever has journaled on its side a roller 88ᵇ which engages a cam 89 on the shaft 70, which roller is maintained in constant engagement with the cam by means of a spring 90 connected at its upper end to the frame of the machine and at its lower end to the slide 86ª. As a result of the construction described, in the rotation of the cam, the knife will be positively moved downwardly to perform its stripping action, and will be restored to its upper normal position by the spring.

The operating mechanism of the wrapping machine receives its motion from the shaft 63 which in turn is driven by the clutch-controlled sprocket wheel 59, and inasmuch as the connection of the clutch is effected by the operation of parts which in turn control the connection of the ejecting slide with the operating arm 43, the wrapping mechanism will remain out of action until the ejecting slide becomes active to perform its function. Therefore, if a print is not compressed to the proper density and is not to be discharged from the forming mechanism, the wrapping mechanism will remain inactive.

It will be understood that when the forming disks are changed as heretofore described, in order to provide for the production of prints of different size, a change will be required in the size of the guiding chamber 41 through which the print is discharged by the ejecting slide, it being desirable that this guiding chamber correspond in cross-sectional form and area to the size of the mold cell in which the prints are formed.

Having thus described my invention, what I claim is:

1. In a machine of the type described, the combination of an outer forming member, and an inner forming member rotatable within the outer member, said members having their adjacent faces constructed to conjointly form mold cells in their rotation, means for rotating one of said members, and means whereby the driven member imparts its motion to the other member.

2. In a machine of the type described, the combination of an outer rotary member provided on its inner face with formative cavities, an inner rotary member mounted eccentrically within the outer member and provided in its outer face with formative cavities, said cavities adapted in the rotation of said members to conjointly form mold cells, the portions of said members between the cavities being adapted to engage each other to effect a driving connection between the members, and means for rotating one of said members.

3. In a machine of the type described, the combination of an outer rotary member provided on its inner face with formative cavities, an inner rotary member mounted eccentrically within the outer member and provided in its outer face with formative cavities, said cavities adapted in the rotation of said members to conjointly form mold cells, the portions of said members between the cavities being adapted to engage each other to effect a driving connection between the members, and means for rotating said outer member.

4. In a machine of the type described, the combination of an outer rotary forming member provided with inwardly extending blocks constituting cavities in the inner face of said member, an inner rotary forming member mounted within the outer member and provided with outwardly extending blocks constituting cavities in the outer face of said member, the adjacent ends of said blocks on the respective members adapted to engage each other with a driving action to drive one member from the other, and means for rotating one of said members.

5. In a machine of the type described, the combination of an outer rotary forming member provided with inwardly extending blocks constituting cavities in the face of said member, an inner rotary forming member mounted within the outer member and provided with outwardly extending blocks constituting cavities in the outer face of said member, the adjacent ends of said blocks on the respective members adapted to engage each other with a driving action, and means for rotating said outer member.

6. In a machine of the type described, the combination of an outer rotary member provided with inwardly extending blocks constituting formative cavities on the inner face of said member, a rotary inner member mounted within the outer member and provided with outwardly extending blocks constituting formative cavities in the outer face of said member, the ends of the blocks on one member being provided with slots, teeth on the blocks of the other member adapted to engage in said slots; whereby the rotation of one member will act to rotate the other member, and means for rotating one of said members.

7. In a machine of the type described, the combination of an outer rotary member provided with inwardly extending blocks constituting formative cavities on the inner face of said member, a rotary inner member mounted within the outer member and provided with outwardly extending blocks constituting formative cavities in the outer face of said member, the ends of the blocks on one member being provided with slots, teeth on the blocks of the outer member adapted to engage in said slots, the said slots being greater in length than the teeth so as to leave a space at the ends of the teeth, and means for rotating one of said members.

8. In a machine of the type described, the combination of fixed side plates, and inner and outer rotary forming members mounted removably between said plates, and having their adjacent faces constructed to conjointly form mold cells in their rotation, and releasable means for retaining the outer member in operative position between said plates.

9. In a machine of the type described, the combination of fixed side plates provided with guiding supports, an outer forming member mounted between said plates and rotatable on said supports, and an inner forming member rotatable between said plates within the outer member, said supports being movable to permit the outer member to be removed from between the plates.

10. In a machine of the type described, the combination of opposing side plates, outer and inner forming members mounted rotatably between said plates and movable therefrom, and a supporting cradle adapted to give temporary support to said outer forming member in the removal of the latter from between said plates.

11. In a machine of the type described, the combination of opposing side plates, a movable supporting cradle provided with guiding supports, a removable outer forming member mounted between said plates and rotatable on said guiding supports, and an inner forming member rotatably mounted within the outer member, said cradle and its supports adapted to be moved relatively to the plates to permit the outer forming member to be removed from between the plates, and said cradle when so moved being adapted to give temporary support to the forming member when the latter is removed.

12. In a machine of the type described, the combination of mechanism operable to successively form mold cells movable progressively forward, means for feeding the material to be molded to said mechanism, a testing member operable by a predetermined pressure of the material in a mold cell when the latter is in one position, and an ejecting device removed from the testing member and adapted to act on the material when said cell is in its advanced position, the said ejecting device being controlled in its action by the testing member.

13. In a machine of the type described, the combination of mechanism operable to successively form mold cells movable progressively forward, means for feeding the material to be molded to said mechanism, a testing member operable by a predetermined pressure of the material in a mold cell when the latter is in one position, an ejecting device removed from the testing member and adapted to act on the material when the cell is in an advanced position, operating means for the ejecting device normally out of driving connection with the same, and means controlled in its action by the testing member for effecting driving connection between the operating means and ejecting device.

14. In a machine of the type described, the combination of mechanism operable to form a mold cell movable from one position to another, means for feeding the material to be molded to said mechanism, a testing member operable by a predetermined pressure of the material in the cell when the latter is in one position, and an ejecting device situated at a point removed from the cell in said position, and operable to act on the material in said cell when the latter is moved to another position, said ejecting device being controlled in its action by the testing member.

15. In a machine of the type described, the combination of mechanism operable to form a mold cell movable from one position to another, means for feeding the material to be molded to said mechanism, a testing member operable by a predetermined pressure of the material in the cell when the latter is in one position, an ejecting device in position to act on the material in the cell when the latter is in another position, a reciprocating operating member for the ejecting device movable to and from the testing member and normally disconnected from the ejecting device, and means operable by the testing member, when the operating member moves in one direction, to effect connection of the operating member with the ejecting device when the operating member moves in the opposite direction.

16. In a machine of the type described, the combination of mechanism operable to form a mold cell, means for feeding the material to be molded to said mechanism, a testing member operable by a predetermined pressure of the material in said cell, an ejecting device movable to eject the material from the cell, a continuously acting operating member for the ejecting device normally disconnected therefrom, and means controlled by the operation of the testing member, for effecting periodic connection of the operating member with the ejecting device.

17. In a machine of the type described, the combination of mechanism operable to form a mold cell movable from one position to an advanced position, means for feeding the material to be molded to said mechanism, a testing member operable by a predetermined pressure of the material in said cell when the latter is in one position, an ejecting device movable to eject the contents of the cell when the latter is in an advanced position, an operating member for the ejecting device movable to and from the testing member and normally out of operative connection with the ejecting device, controlling means operated by the testing member when the operating member moves toward the same, to control the connection of the operating member with the ejecting device, and means for moving the cell to an advanced position subsequent to the operation of said controlling means.

18. In a machine of the type described, the combination of mechanism operable to form mold cells, means for feeding the material to be molded to said mechanism, a testing member operable by a predetermined pressure of the material in a cell, an ejecting device movable to eject material from the cell, an operating member for the ejecting device normally disconnected therefrom and movable to and from the testing member, and parts carried by the operating member and adapted to be set by the testing member when the operating member moves toward the same, said parts acting when set, to effect a driving connection between the operating member and the ejecting device, when the operating member moves away from the testing chamber.

19. In a machine of the type described, the combination of mechanism operable to form a mold cell, means for feeding the material to be molded to said mechanism, a testing member operable by a predetermined pressure of the material in said cell, an ejecting device movable to eject the contents of the cell, an operating member for the ejecting device, a driving dog thereon adapted to engage and drive the ejecting device, releasable means for holding said dog out of driving connection with the ejecting device, and means controlled by the operation of the testing member, for releasing said means to permit the dog to effect driving connection with the ejecting device.

20. In a machine of the type described, the combination of a frame provided with a forming chamber, forming members operative in said chamber to form a mold cell, means for feeding the material to be molded into said chamber in a mass, an ejecting device for discharging the molded material from the cell, said ejecting device being normally inactive, and means acting when the pressure of the material in the cell reaches a predetermined point, to render the ejecting device active to eject the molded material, said forming members operating on the failure of the ejecting device to act, to mingle the molded material with the mass in the forming chamber.

21. In a machine of the type described, the combination of a frame having a forming chamber, means for feeding the material thereto, coöperating forming members rotatable in said chamber and provided with formative cavities adapted in the rotation of said members to close together on the material and successively form mold cells at one point in the chamber, and to separate from each other at an advanced point therein, an ejecting device normally inactive, and means operative when the pressure of material in the mold cell reaches a predetermined point, to render the ejecting device operative; whereby if the molded material in the cell is not of the required density to effect its discharge, it will be mingled with the mass of material in the forming chamber.

22. In a machine of the type described, the combination of opposing plates provided at one point with alined openings, forming members movable between said plates and constructed in their adjacent faces to form a mold cell in line with said openings, means for feeding the material to the action of said forming members, a normally inactive ejecting device movable in said alined openings to eject the molded material from the cell, said ejecting device normally closing one of said alined openings, a movable plate normally closing the other alined opening, controlling means governed by the density of the material in the mold cell, for rendering the ejector active when the density reaches a predetermined point, and means governed by said controlling means for moving the plate from over said opening; whereby if the molded material is not of the proper density the alined openings will remain covered.

23. In a machine of the type described, the combination of opposing plates, one of which is formed at one point with an opening, and said plates being formed at an advanced point with alined openings, a testing member movable in said first mentioned opening, an ejecting device movable in said alined openings, inner and outer forming members rotatable between said opposing plates and having formative cavities in their adjacent faces, adapted in the rotation of the members to conjointly form mold cells which are presented in succession in line with the testing member and ejecting device, the said testing member adapted to yield when the pressure of the material in the cell presented at that point reaches a predetermined degree, and means controlled by the movement of said testing member, for rendering said ejector active to eject the contents of the mold cell, when the latter is presented to the ejecting device.

24. In a machine for molding prints and the like, the combination of a mold, means for feeding the material to be molded thereto, a movable ejecting device provided with an active face adapted to engage the face of the print and eject the same from the mold, and a stripping knife movable to separate the contacting faces of the ejecting device and print.

25. In a machine for molding prints and the like, the combination of a mold, means for feeding material thereto, a movable ejecting device provided with an active face adapted to engage the face of the print and eject the same from the mold, means for moving the print in a direction transversely of its ejecting movement, and a transversely acting stripping knife to separate the contacting faces of the ejecting device and print.

26. In a machine for molding prints and the like, the combination of a mold open at its end, a movable cover plate normally closing said end of the mold and provided with a guiding chamber, adapted, when the plate is moved to open the mold, to register with the open end of the same, and an ejecting device movable in said mold and adapted to eject the print through the guiding chamber.

27. In a machine for molding prints and the like, the combination of means for forming plastic material into prints, a normally inactive ejecting device for discharging the prints, means controlled by the density of the print for rendering the ejecting device active, a normally inactive wrapper-applying mechanism to which the prints are delivered by the ejecting device, and means operating when the ejecting device is rendered active, to operate the wrapper-applying mechanism.

28. In a machine for molding prints and the like, the combination of a rotary forming member provided with driving lugs, a rotary driving arm adapted to engage the lugs in succession and advance said member step by step, and a locking cam movable with the arm and intersecting the path of movement of the lugs; whereby the rotary member will be prevented from advancing, while the arm is moving around from one lug to engage the next.

29. In a machine for molding prints and the like, the combination of a rotary forming member provided with driving lugs, a rotary driving arm adapted to engage the lugs in succession and advance the member step by step, said arm being provided with a rearwardly extending end curved in an arc whose center is coincident with the axis of rotation of the arm, and a locking cam movable with the arm and intersecting the path of movement of the lugs; whereby the rotary member will be locked against retrograde movement by the curved end of the driving arm, and will be locked against advance movement by the cam.

30. In a machine for molding prints and the like, the combination of a rotary forming member provided with driving lugs, a rotary driving arm adapted to engage the lugs in succession and advance said member step by step, and a locking cam movable with the arm and intersecting the path of movement of the lugs, said cam being provided in advance of the driving arm with a cavity in which the lug will seat as it is advanced by the arm.

31. In a machine of the type described, the combination of molding mechanism, a feeding hopper to contain the material to be molded, a feeding chute leading from the hopper to the molding mechanism, and a horizontal rotary feeding disk between the hopper and chute, said disk being provided with a radial slot, the advancing edge of which is at a higher level than the other edge.

32. In a machine of the type described, the combination of a molding mechanism, a feeding hopper containing the material to be molded, a feeding chute leading from the hopper to the molding mechanism, and a horizontal rotary feeding disk between the hopper and chute, said disk being provided with a radial slot, and the plane of the disk extending at a downward inclination from the advancing edge of the slot to its other edge.

33. In a machine of the type described, the combination of a molding mechanism, a hopper to contain material to be molded, a feeding chute leading from the hopper to the molding mechanism, and a horizontally rotating feeding member between the hopper and chute, said member being provided with a radially extending cord or wire adapted in the rotation of the member to enter the material and effect an initial cut therein.

34. In a machine of the type described, the combination of a molding mechanism, a hopper to contain the material to be molded, a feeding chute leading from the hopper to the molding mechanism, and a horizontally rotating feeding member between the hopper and chute, said member being provided with a radially extending wire adapted to effect an initial cut in the mass of material in the hopper, and said member being provided in rear of said wire, with a knife adapted to effect the separation of the material from the overlying mass.

35. In a machine of the type described, the combination of molding mechanism, a hopper to contain the material to be molded, and feeding mechanism including a member movable at the base of the hopper, and a cutting wire supported by said member and extending slack between its points of support.

36. In a machine of the type described, the combination of molding mechanism, a hopper to contain the material to be molded, and means for separating a paring of said material continuously from the bottom of the mass in the hopper.

37. In a machine of the type described, the combination of molding mechanism, a hopper to contain the material to be molded, and means for separating a paring of said material continuously from the bottom of the mass in the hopper and advancing it to the action of the molding mechanism.

38. In a machine of the type described, the combination of inner and outer rotary forming members arranged one within the other and having their adjacent edges constructed to conjointly form mold cells in their rotation, means for feeding the material to be molded between said forming members, and an ejecting device movable axially through the mold cells in succession to eject the molded material therefrom.

39. In a machine of the type described, the combination of inner and outer rotary forming members arranged one within the other and having their adjacent edges constructed to conjointly form mold cells in their rotation, means for feeding the material to be molded between said forming members, a testing member operable by a predetermined pressure of the material in a mold cell when the latter is in one position, and an ejecting device adapted to act on the material when said cell is in another position, the said ejecting device being controlled in its action by the testing member.

40. In a machine of the type described, the combination of mechanism operable to successively form mold cells movable progressively forward, means for feeding the material to be molded to said mechanism, a testing member operable by a predetermined pressure of the material in the mold cell in the molding formation of said material, and an ejecting device adapted to act on the molded material, said ejecting device being distinct from but controlled in its action by the testing member.

41. In a machine of the type described, the combination of side plates formed with alined openings, a forming ring rotatably mounted between said plates, a forming disk rotatably mounted between the plates eccentrically within the forming ring, said ring and disk being provided in their adjacent edges with cavities adapted to conjointly form mold cells movable successively past the alined openings in the plates, means for feeding the material to be molded into the space between the ring and disk and a plunger movable through the openings in the plates and the alined cell to discharge the molded material therefrom.

42. In a machine of the type described, the combination of side plates formed with alined openings, a forming ring rotatably mounted between said plates, a forming disk rotatably mounted between the plates eccentrically within the forming ring, said ring and disk being provided in their adjacent edges with cavities adapted to conjointly form mold cells movable successively past the alined openings in the plates, means for feeding the material to be molded into the space between the ring and disk, a testing member operable by a predetermined pressure of the material in a mold cell during the molding formation of the material, and an ejecting plunger movable through the openings in the plates and the alined cell to discharge the molded material therefrom, said ejecting plunger being controlled in its action by the testing member.

In testimony whereof, I have affixed my signature in presence of two witnesses.

BRUCE V. EDWARDS.

Witnesses:
W. R. Kenney,
Wm. J. Dolan.

Copies of this patent may be obtained for five cents each, by addressing the "Commissioner of Patents, Washington, D. C."